(12) United States Patent
Macauley et al.

(10) Patent No.: US 8,461,964 B2
(45) Date of Patent: Jun. 11, 2013

(54) COMMUNICATIONS PATCHING SYSTEMS WITH RADIO FREQUENCY IDENTIFICATION ANTENNA SWITCHING CIRCUITS

(75) Inventors: Daniel W. Macauley, Fishers, IN (US); Danny L. Satterthwaite, Allen, TX (US); Peter T. Tucker, Dallas, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 1442 days.

(21) Appl. No.: 11/871,448

(22) Filed: Oct. 12, 2007

(65) Prior Publication Data

US 2009/0096581 A1    Apr. 16, 2009

(51) Int. Cl.
*H04Q 5/22*       (2006.01)
*G08B 13/14*    (2006.01)

(52) U.S. Cl.
USPC ........................................ 340/10.1; 340/572.7

(58) Field of Classification Search
USPC ........................................................ 340/10.1
See application file for complete search history.

(56) References Cited

U.S. PATENT DOCUMENTS

| | | | |
|---|---|---|---|
| 4,673,831 A * | 6/1987 | Reppen .......................... | 327/374 |
| 5,182,833 A * | 2/1993 | Yamaguchi et al. ............. | 15/319 |
| 5,497,009 A * | 3/1996 | Torikoshi et al. .............. | 250/574 |
| 6,181,257 B1 * | 1/2001 | Meek et al. ............... | 340/870.01 |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,289,496 B1 * | 9/2001 | Anderson et al. ............. | 716/116 |
| 6,330,307 B1 | 12/2001 | Bloch et al. | |
| 6,350,148 B1 | 2/2002 | Bartolutti et al. | |
| 6,424,710 B1 | 7/2002 | Bartolutti et al. | |
| 6,522,737 B1 | 2/2003 | Bartolutti et al. | |
| 6,584,301 B1 * | 6/2003 | Bohn et al. .................... | 455/41.1 |
| 6,688,910 B1 | 2/2004 | Macauley | |
| 6,784,802 B1 * | 8/2004 | Stanescu ........................ | 340/687 |
| 6,968,994 B1 | 11/2005 | Ashwood Smith | |
| 7,170,393 B2 | 1/2007 | Martin | |
| 7,764,191 B2 * | 7/2010 | Hall et al. ................ | 340/825.69 |
| 2006/0148279 A1 | 7/2006 | German et al. | |
| 2006/0160396 A1 | 7/2006 | Macauley et al. | |
| 2007/0057259 A1 * | 3/2007 | Nagumo ......................... | 257/67 |
| 2007/0058030 A1 * | 3/2007 | Nagumo ........................ | 347/247 |
| 2007/0211689 A1 * | 9/2007 | Campero et al. .............. | 370/351 |
| 2007/0236355 A1 | 10/2007 | Flaster et al. | |
| 2008/0122579 A1 * | 5/2008 | German et al. .............. | 340/10.1 |

FOREIGN PATENT DOCUMENTS

WO    WO 2006/063023 A1    6/2006

OTHER PUBLICATIONS

International Search Report and Written Opinion (12 pages) corresponding to International Application No. PCT/US2008/011546; Mailing Date: Mar. 9, 2009.

* cited by examiner

*Primary Examiner* — Brian Zimmerman
*Assistant Examiner* — Cal Eustaquio
(74) *Attorney, Agent, or Firm* — Myers Bigel Sibley & Sajovec

(57) ABSTRACT

Communications patching systems may include one or more patch panels, each of which has plurality of connector ports. A plurality of antennas are provided. Each antenna may be associated with a specific connector port. A radio frequency identification ("RFID") transceiver and a controller are also provided. A switching circuit is coupled between an output of the RFID transceiver and the plurality of antennas. This switching circuit includes a plurality of switches that are configured to selectively couple one of the plurality of antennas to the output of the RFID transceiver under the control of the controller.

11 Claims, 7 Drawing Sheets ly to communications
patching systems and, more particularly, to communications
patching systems that include radio frequency identification
("RFID") capabilities for tracking patching connections.

COMMUNICATIONS PATCHING SYSTEMS WITH RADIO FREQUENCY IDENTIFICATION ANTENNA SWITCHING CIRCUITS

FIELD OF THE INVENTION

The present invention relates generally to communications patching systems and, more particularly, to communications patching systems that include radio frequency identification ("RFID") capabilities for tracking patching connections.

BACKGROUND

Many businesses have dedicated communications systems that enable computers, servers, printers, facsimile machines and the like to communicate with each other, through a private network, and with remote locations via a telecommunications service provider. In, for example, most commercial office buildings, the dedicated communications system is hard wired using communications cables that contain conductive wire. In such hard wired systems, individual connector ports such as modular wall jacks are mounted in most or all of the offices throughout the building. Communications cables are run through, for example, the walls and/or ceiling of the building to electrically connect each connector port to network equipment that is located in, for example, a telecommunications closet or computer room. Communications lines from, for example, network servers and/or the interface hub of a main frame computer may also terminate within the computer room or telecommunications closet, as may communication lines from external telecommunication service providers.

A communications patching system is often used to interconnect the various communication lines (e.g., communications cables) within a computer room or telecommunications closet. Communications patching systems are typically used to terminate the communications lines within a building because the number of communications lines is often quite large, and such patching systems may facilitate terminating the lines in an organized fashion and can simplify the process for later making changes to the connections between communications lines. Typically, a communications patching system includes one or more mounting frames, usually in the form of equipment racks. Network equipment such as, for example, network servers and switches may be mounted on these mounting frames, as may one or more "patch panels." As is known to those of skill in the art, a "patch panel" refers to an interconnect device that includes a plurality of connector ports such as, for example, communications jacks or fiber optic couplers on one side thereof. One or more communications cables may also be terminated into the patch panel, usually on a reverse side thereof (the conductors of each cable can be terminated into individual contacts such as, for example, insulation displacement contacts that are often used to terminate the conductors of a twisted pair cable, or may be terminated using a connector port such as would be the case with an RJ-45 to RJ-45 patch panel). The patch panel may provide communications paths between each connector port and a respective one of the communications cables that is terminated into the patch panel. As discussed below, communications patching systems may be used to connect each individual connector port in an office building (or portion thereof) to, for example, network equipment that is co-located in the telecommunications closet and/or to external communications lines.

By way of example, FIG. 1 illustrates one exemplary configuration of the equipment in a computer room 2 of an office building. As shown in FIG. 1, a first equipment rack 10 is provided. A plurality of patch panels 12 are mounted on the first equipment rack 10. Each patch panel 12 includes a plurality of port assemblies 14. Each illustrated poll assembly 14 contains a plurality of connector ports 16. In the illustrated embodiment, each connector port 16 comprises a modular RJ-45 jack that is configured to receive a modular RJ-45 plug connector. In the illustrated example of FIG. 1, six such RJ-45 jacks are provided per port assembly 14, and four port assemblies 14 are provided per patch panel 12 for a total of twenty-four jacks per patch panel 12. While FIG. 1 illustrates patch panels 12 that have RJ-45 connector ports 16, it will be appreciated that other types of patch panels are known, including patch panels with optical fiber ports (e.g., SC, ST, and FC ports), patch panels with other types of twisted copper wire pair connector ports 16 (e.g., RJ-11 ports) and patch panels that include multiple different types of connector ports. The number of connector ports 16 per port assembly 14 may also vary, as may the total number of connector ports 16 per patch panel 12. In some patch panels 12, a larger number of individual connector ports 16 may be used as opposed to port assemblies 14 that include a plurality of connector ports 16.

As is also shown in FIG. 1, a plurality of communications cables 20 are routed into the computer room 2. As shown with respect to one exemplary communications cable 20, each cable 20 may be connected to the back end of, for example, modular wall jacks 22 that are mounted in wall plates 24 in offices 4 throughout the office building. Thus, each communications cable 20 is routed from a jack 22 through, for example, the walls and/or ceiling of the building, to the computer room 2, where each communications cable 20 is terminated onto the back end of one of the connector ports 16 of one of the patch panels 12. Computers 26 (and/or other equipment that is connected to the network) may be connected to respective of the modular wall jacks 22 by, for example, a patch cord 28. Thus, as shown in FIG. 1, a communications path is established between each computer 26 (or other piece of networked equipment) and a respective one of the connector ports 16 on one of the patch panels 12 mounted on equipment rack 10.

As is further shown in FIG. 1, a second equipment rack 30 may be provided in, for example, the computer room 2. Network equipment such as, for example, one or more network servers 40, are mounted on rack 30. One or more external communications lines 50 are connected to one or more of the network servers 40. A plurality of switches 60 may also be provided. In the particular communications patching system of FIG. 1, each of the switches 60 includes a plurality of connector ports 66. The switches 60 may be connected to one or more of the servers 40 using patch cords 70. The ends of each patch cord 70 are terminated with connectors 78, such as, for example, an RJ-45 or RJ-11 plug. As is also shown in FIG. 1, a second set of patch cords 76 that include connectors 78 on each end thereof may be used to interconnect a connector port 16 on one of the patch panels 12 with a connector port 66 on one of the switches 60. In order to simplify FIG. 1, only a single patch cord 70 and a single patch cord 76 are shown. Typically, however, multiple patch cords 70 will be provided that connect connector ports 66 with connector ports 46 on the servers 40, and a large number of patch cords 76 will be provided that connect connector ports 66 on the switches 60 with connector ports 16 on patch panels 12. Thus, as shown in FIG. 1, the above described communications patching system may be used to connect each computer, printer, facsimile machine and the like 26 located throughout the office building to the network servers 40 by respective communications paths that extend from the computer 26 at issue, through a patch cord 28 to a modular wall jack 22, through a cable 20 that connects each wall jack 22 to a connector port 16, through a patch cord 76 to a connector port 66 on switch 60, and through a patch cord (or other communications cable) 70 to a network server 40.

In many businesses, each employee is assigned his or her own computer network access exchange number so that the employee can interface with a main frame computer or computer network. When the employee changes office locations, it may not be desirable to provide that employee with a new access exchange number. Rather, to preserve consistency in communications, it may be preferred that the access exchange number (or numbers) of the communication connector port in the employee's old office (e.g., the modular wall jack 22 of FIG. 1) be transferred to the connector port in the employee's new office. To accomplish this task, patch cords in the telecommunication closet are rearranged (e.g., patch cord 76 in FIG. 1 may be removed from a first connector port 16 and plugged into a different connector port 16) so that the employee's old access exchange number(s) are now received in his/her new office.

As employees move, change positions, and/or add communications lines, the patch cords in a typical telecommunications closet may be rearranged quite often. As it is desirable to keep track of these changes for many different reasons, the interconnections of the various patch cords in a telecommunications closet are often logged in either a paper or computer-based log. However, technicians may neglect to update the log each and every time a change is made, and/or may make errors in logging changes. As such, paper or computer based logs may more often than not fail to be 100% accurate so that the technician cannot have full confidence from reading the log where each of the patch cords begins and ends. Accordingly, each time a technician needs to change a patch cord, the technician often manually traces that patch cord between two connector ports. To perform a manual trace, the technician locates one end of a patch cord and then manually follows the patch cord until he/she finds the opposite end of that patch cord. Once the two ends of the patch cord are located, the patch cord can be positively identified.

Unfortunately, due to the large number of patch cords that are typically being used at any one time and/or the cable routing mechanisms that are typically used to keep the cable portions of each patch cord out of the way and neatly routed, it may take a significant amount of time for a technician to manually trace a particular patch cord. Furthermore, manual tracing may not be completely accurate and technicians may accidentally go from one patch cord to another during a manual trace. Such errors may result in misconnected communication lines which must be later identified and corrected. Also, it may be difficult to identify the correct port to which a particular patch cord end should be connected or disconnected. Thus, ensuring that the proper connections are made can be time-consuming, and the process is prone to errors in both the making of connections and in keeping records of the connections.

It will be appreciated that the patching system described above with respect to FIG. 1 is exemplary in nature, and is discussed merely for purposes of describing one exemplary prior art communications patching system which could be upgraded to include various of the features of embodiments of the present invention. Numerous changes could be made thereto including, without limitation, using different types of patch panels, including more or less equipment racks, changes in the type of network or other equipment that is connected through the patching system, etc. As one specific example, FIG. 1 depicts a simplified version of an "interconnect" patching system. However, another commonly used equipment configuration which are typically referred to as "cross-connect" patching systems has the communications path from a modular wall jack (e.g., jack 22) to a network sever (e.g., server 40) pass through at least two patch panels 12 instead of passing directly from a patch panel 12 to a switch 60 as shown in the inter-connect arrangement of FIG. 1. In cross-connect systems, the connector ports 66 of switches 60 may, for example, be terminated via cables that are hard-wired into the back end of individual connector ports 16 on the last patch panel 12 in the chain of two or more patch panels. Thus, in cross-connect systems the patch cords 76 in FIG. 1 may be used to interconnect connector ports 16 on two different patch panels 12, instead of being used to connect a patch panel connector port 16 to a switch connector port 66. Those of skill in the art will realize that numerous other equipment configurations are possible. Accordingly, the above-description is not intended to be limiting with respect to the present invention that is described and claimed herein.

Systems are known in the art that are designed to at least partially automate the process of detecting and identifying the ends of patch cords in a telecommunications closet. For example, U.S. Pat. No. 6,222,908 describes a communications patching system in which each patch cord connector (e.g., plug) includes a unique identifier, and each connector port on the patch panels includes a sensor that reads the unique identifier on any patch cord connector inserted therein. Likewise, U.S. Pat. No. 6,784,802 describes a system for monitoring connectivity in a cable system that includes radio frequency identification transponders on cable ends and radio frequency identification sensors at connection points. These sensors are connected to a central monitoring system that records the presence of a particular cable at a particular connection point. U.S. Pat. No. 6,424,710 and U.S. Pat. No. 6,968,994 describe other prior art techniques.

SUMMARY

According to embodiments of the present invention, communications patching systems are provided that include a patch panel (or other interconnect device such as, for example, a network switch) that has a number of connector ports and a number of antennas, These systems also include a radio frequency identification ("RFID") transceiver and a controller such as, for example, a microcontroller. A switching circuit is coupled between an output of the RFID transceiver and the antennas. The switching circuit has a number of switches that are configured to selectively couple one of the antennas to the output of the REID transceiver under the control of the controller.

In some embodiments, the switching circuit includes a plurality of thyristors. Each of these thyristors is coupled between the output of the RFID transceiver and a respective one of the antennas. The switching circuit may also include a plurality of transistors, wherein each of the transistors is coupled to a gate lead of a respective one of the thyristor-s. The switching circuit may further include a shift register that has a plurality of outputs that are coupled to respective ones of the transistors. Additionally, an output of the controller may be coupled to an input of the shift register. The RFID transceiver may also operate in response to the controller, and the controller may be configured to activate the RFID transceiver prior to applying a turn-on voltage to the control gate of any of the transistors.

Pursuant to further embodiments of the present invention, communications patching systems are provided that include an interconnect device, such as a patch panel, that has a plurality of connector ports and a plurality of antennas. Each of the antennas is associated with a respective one of the connector ports. These systems further include an RFID transceiver and a plurality of switches. In these systems, a first output of the RFID transceiver is commonly coupled to a first input of each of the antennas through respective ones of the switches, and a second output of the RFID transceiver is commonly coupled to a second input of each of the antennas.

In some embodiments, each of the switches may comprise a thyristor. Each switch may also include a transistor that is coupled to a gate lead of the thyristor. The communications patching system may also include a controller having a first output that is coupled to the RFID transceiver and a second output that is commonly coupled to respective control terminals of each of the transistors. The controller may identify and log patch cord interconnections with the connector ports. The system may further include a shift register that is responsive to the controller, the shift register having a plurality of outputs that are coupled to respective ones of the transistors.

Pursuant to further embodiments of the present invention, communications patching systems are provided that include a patch panel that has a plurality of connector ports, a plurality of antennas, an RFID transceiver and a plurality of thyristors. Each of the antennas is associated with a respective one of the connector ports. Each thyristor may be coupled between the output of the RFID transceiver and a respective one of the antennas. The communications patching system may also include a plurality of transistors, each of which is coupled to a gate of a respective one of the thyristors. In these systems, the output of the RFID transceiver may include first and second output leads. The first output lead may be coupled to a first input of each of the antennas through a respective one of the thyristors, and the second output lead may be coupled to a second input of each of the antennas. The patching system may also include one or more patch cords, each of which is configured to selectively interconnect a first of the connector ports with a connector port on another interconnect device (e.g., a second patch panel). Each patch cord may comprise opposite ends and a respective connector secured to each end, where each connector is configured to be removably secured within a connector port. Each connector on a particular patch cord may include an RFID tag that stores identification information.

Pursuant to still further embodiments of the present invention, communications patching systems are provided that include a patch panel that has a plurality of connector ports, a plurality of antennas, an RFID transceiver, and a multiplexer that is coupled between an output of the RFID transceiver and the antennas. The multiplexer is configured to selectively couple one of the antennas to an output of the RFID transceiver. Each of the antennas is associated with a respective one of the connector ports. These systems may also include a first power supply terminal that supplies a first direct current voltage to the RFID transceiver and a second power supply terminal that supplies a second direct current voltage to the multiplexer, where the second direct current voltage is greater than the first direct current voltage.

DETAILED DESCRIPTION

Figure 1:
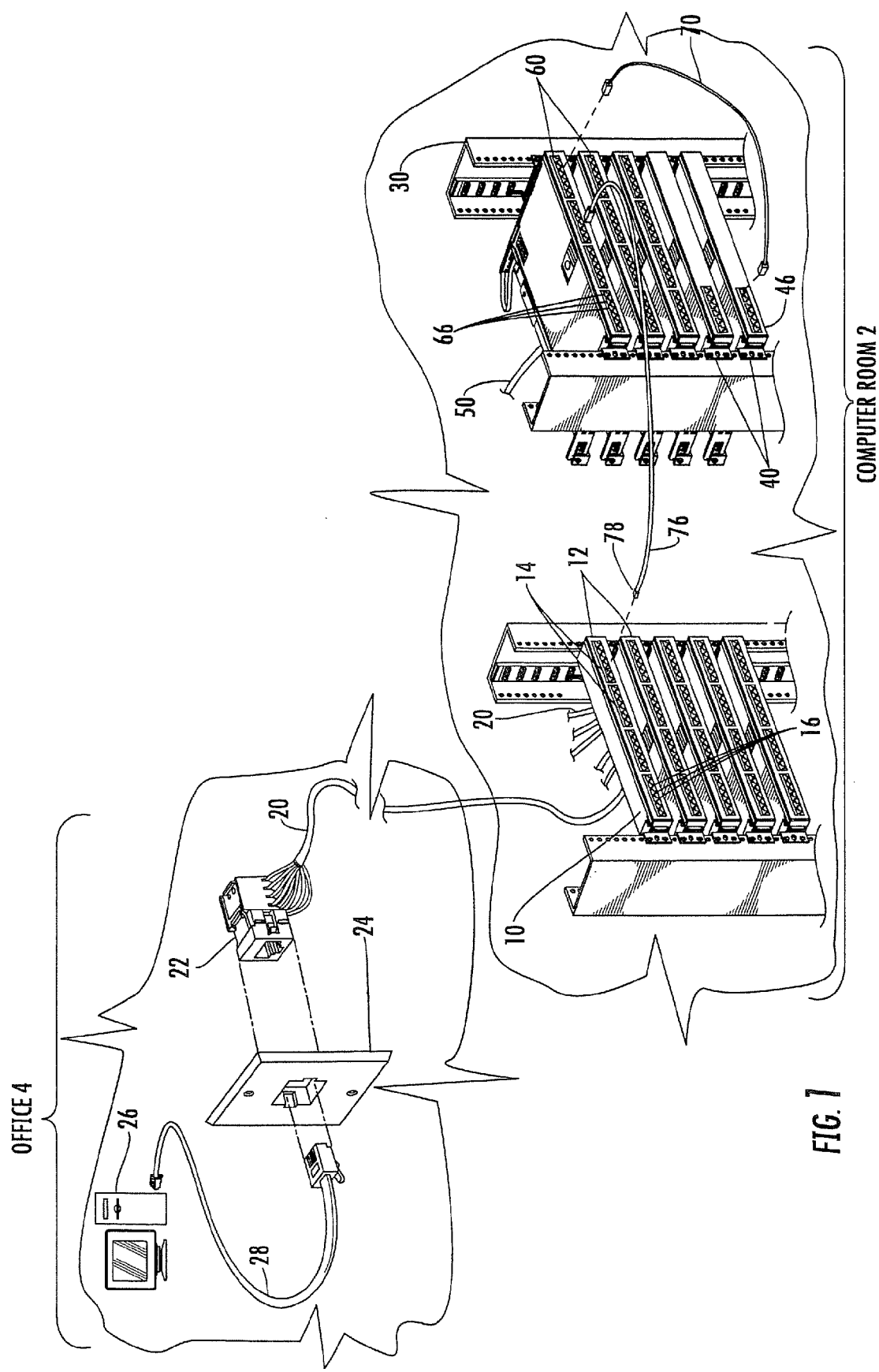
FIG. 1 is a perspective view of an exemplary prior art communications patching system that illustrates how the patching system may be used to connect a computer in an office to, for example, network equipment in a telecommunications closet.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" to another element, it can be coupled directly to the other element, or intervening elements may also be present. In contrast, when an element is referred to as being "directly coupled" to another element, there are no intervening elements present. Likewise, it will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

Pursuant to embodiments of the present invention, communications patching systems are provided that include radio frequency identification ("RFID") antenna switching circuits. As discussed above, communications patching systems typically include one or more mounting frames, one or more patch panels and a plurality of patch cords that are used to connect network servers, switches and other network equipment to individual connector ports (e.g., modular wall jacks) that may be located, for example throughout an office building or portion thereof. Patching systems likewise are routinely used to interconnect telephone equipment (i.e. phones and facsimile machines to PBX ports) or data networking equipment and/or to connect various pieces of network equipment to one another (i.e. switches to routers, PBX systems to central office trunks, etc.). Herein, the present disclosure and claims focus primarily on the elements of the communications patching system that use REID identification to identify which specific patch cords are plugged into or otherwise connected to specific connector ports of the patch panel(s), network switches and the like included in the communications patching system.

As is known to those of skill in the art, RFID refers to a class of applications in which items that are to be tracked are "tagged" with an RFID tag. An RFID tag refers to a specially designed electronic tag, which is typically implemented as the combination of a computer chip and an antenna, that is placed on, or embedded in, an object. These RFID tags work in conjunction with an RFID transceiver and an RFID antenna. An "RFID transceiver" refers to a class of circuit(s), chip(s) or device(s) that transmit a signal that may be used to (a) energize or "excite" an RFID tag and (b) receive and decode information that is transmitted by the energized RFID tag. The RFID transceiver may comprise a single circuit, chip or device, or may comprise multiple circuits, chips and/or devices. A variety of RFID transceivers are commercially available such as, for example, the Philips HTRC110 IC RFID transceiver. RFID antennas refer to a type of antenna that emits a field in response to receiving a signal from, for example, an RFID transceiver. The RFID antenna may also receive and pass to the RFID transceiver a signal that is transmitted from an excited RFID tag. Operation of the principles of radio frequency identification will now be described with reference to FIG. 2.

Figure 2:
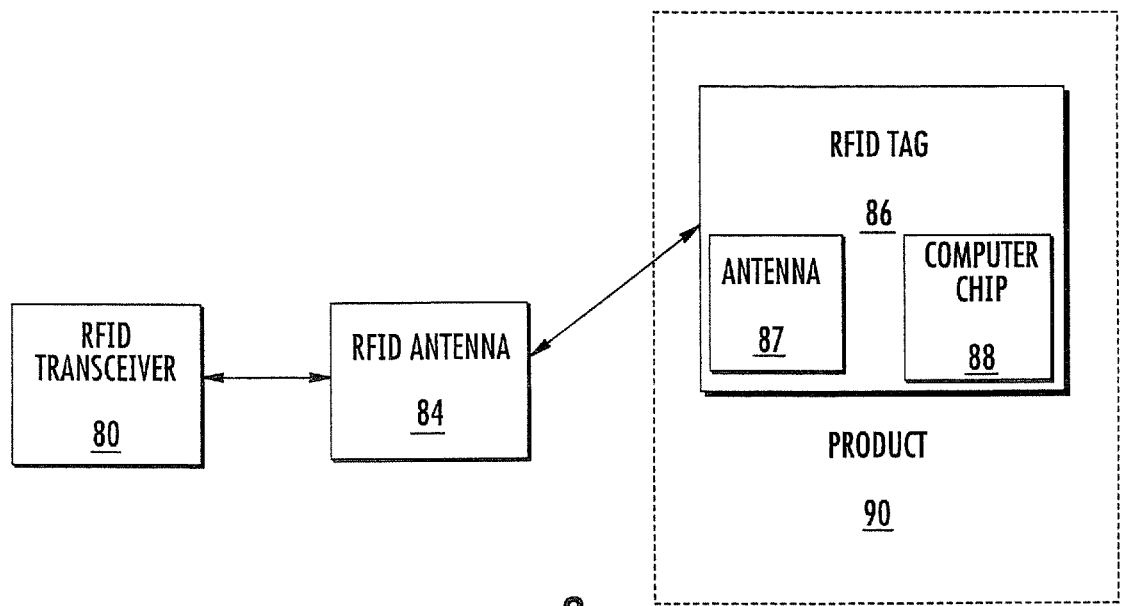
FIG. 2 is a schematic diagram illustrating operation of a radio frequency identification system.

As shown in FIG. 2, an RFID transceiver 80 sends a signal to an RFID antenna 84. The RFID antenna 84 broadcasts the signal as a radio frequency ("RF") broadcast signal. This RF broadcast signal may comprise, for example, an alternating current signal of fixed amplitude and frequency, with the frequency matching the resonance frequency of the RFID tags that are to be read. As is also shown in FIG. 2, an RFID tag 86 is mounted or embedded in a product 90. The RFID tag 86 includes an antenna 87 and a computer chip 88 in which a unique identifier is stored. The antenna 87 receives the RF broadcast signal. This received RF broadcast signal energizes the RFID tag 86, causing the REID tag 86 to transmit information back to the RFID transceiver 80 by altering the load placed by the RFID tag 86 on the RF broadcast signal that is transmitted by the RFID antenna 84. This variation in load causes the amplitude of the RF broadcast signal to vary over time. The information transmitted by the RFID tag 86 to the RFID transceiver 80 includes the unique identifier that is stored in the memory of the RFID tag 86 (and perhaps other information as well). The RFID transceiver 80 detects these variations in the amplitude of the RF broadcast signal, demodulates them, and converts them from an analog signal to a digital signal. A microcontroller (which could, for example, be embedded within the RFID transceiver 80) may then determine the unique identifier associated with the RFID tag from this digital signal. In this manner, the RFID system can identify and track each RFID tagged product 90 that comes within a specified range of the RFID antenna 84.

Typically, RFID systems are used to detect the presence of any RFID tag that passes a given point. By way of example, an RFID system may be used to track any items that pass through an entrance to a warehouse. In such systems, a single RFID transceiver and a single RFID antenna may be located at the entrance to the warehouse so that the antenna can energize any RFID tags that pass through the warehouse entrance. In contrast to these types of systems, the communications patching systems according to embodiments of the present invention use REID techniques to identify which specific patch cords are plugged into the connector ports of the patch panels (or other equipment such as, for example, switches) that are part of the patching system. In order to accomplish this, an array of RFID antennas is provided such that, for example, each connector port may have its own associated RFID antenna. Each RFID antenna may be intentionally designed to be a low efficiency antenna that emits a field that covers only a very small area (e.g., less than 10 mm$^2$) so that the RFID antenna associated with a first connector port will not energize RFID tags on patch cords inserted into other connector ports. In order to reduce system cost, a single RFID transceiver may be provided (in some embodiments multiple RFID transceivers may be used such as, for example, one RFID transceiver per patch panel) that is switched amongst the plurality of RFID antennas.

The RFID-enabled communications patching systems according to embodiments of the present invention may determine the patch cord connectivity of the patching system (i.e., which patch cords are connected to which connector ports). In particular, an RFID tag may be mounted or otherwise embedded in or attached to each end of a patch cord (typically, the RFID tag is mounted in the connector that is attached to each end of a conventional copper cable or fiber optic patch cord, and the RFID tag on each end of a particular patch cord will contain the same unique identifier stored in a memory portion of the tag). Likewise, an RFID antenna may be located directly above, below, behind or adjacent to a respective one of the connector ports on each patch panel and/or switch. The RFID transceiver is used to sequentially activate each RFID antenna in the system. As noted above, each REID antenna may be a low efficiency antenna so that the RFID antenna associated with a first connector port will not energize an RFID tag on a patch cord connector that is plugged into a different connector port. As such, when each REID antenna is activated, the RFID transceiver can, based on the signal received by the RFID antenna (if any), determine the unique identifier associated with any RFID tag that is mounted on a patch cord connector that is plugged into the connector port that is associated with the RFID antenna. Once all of the REID antennas in the patching system have been sequentially activated, the complete patch cord connectivity for the system will have been identified. This information may be, for example, stored in a database, displayed on a computer screen, printed out in a report, etc.

In some embodiments of the present invention, a controller such as, for example, a printed circuit board mountable microcontroller, may be used to control operation of the system and/or to track the patch cord connectivity for the system. The controller may be connected to a database or other storage system that may be used to store the patch cord connection information that is tracked using the RFID aspects of the systems. The controller may also be coupled to a user interface which may allow a system operator to make queries and receive information regarding the current (or historical) patch cord connections in the communications patching system. While the database and user interface are typically not depicted in the specific embodiments of the present invention discussed and pictured herein, it will be appreciated that each of those embodiments may include either or both a database (or other storage mechanism) and/or user interface, that may, for example, be coupled to the controller.

Figure 5B:
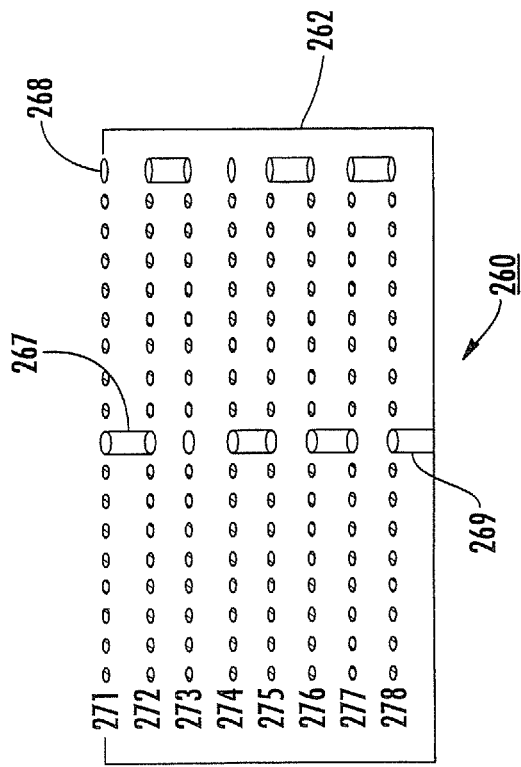
FIGS. 5A and 5B are plan and cross-sectional views, respectively, of a printed circuit board RFID antenna that may be used in the communications patching system according to embodiments of the present invention.
Figure 5A:
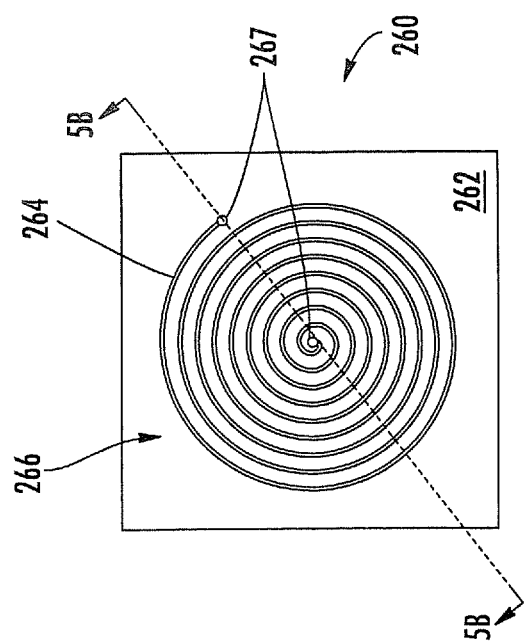

In order to improve the cost effectiveness of the RFID enabled communications patching systems disclosed herein, the systems may use low cost RFID antennas, since an RFID antenna may be provided for every connector port in the patching system. In some embodiments of the present invention, the RFID antennas may be implemented by etching a set of compact, densely spiraled conductive traces on, for example, a multi-layer printed circuit board. An example of one such RFID antenna is depicted in FIGS. 5A and 5B and is described in more detail herein. The cost effectiveness of the system may also be dependent on the mechanism used to switch the RFID transceiver amongst the plurality of antennas that it energizes.

Figure 3:
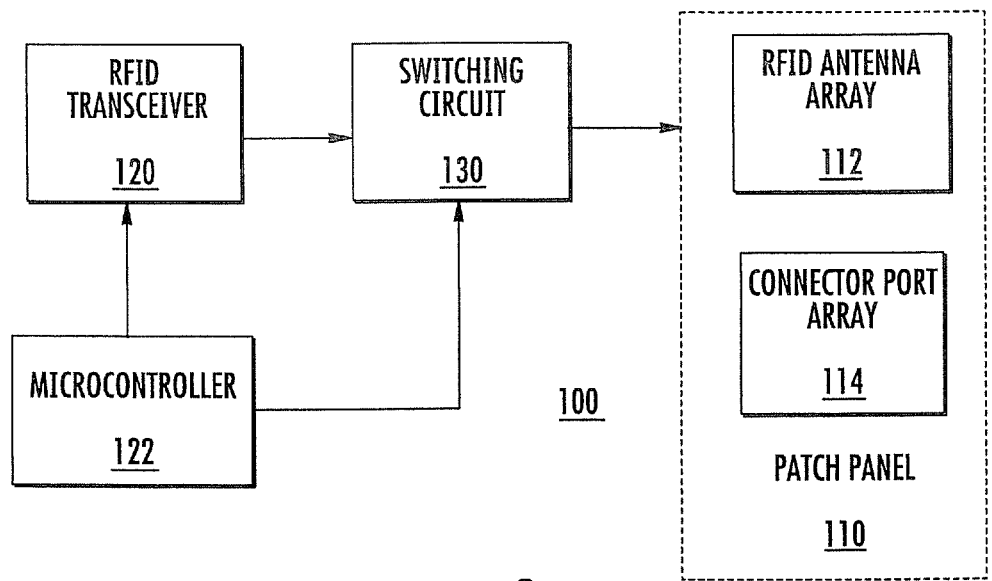
FIG. 3 is a block diagram that illustrates a communications patching system according to embodiments of the present invention.

FIG. 3 is a block diagram of an RFID enabled communications patching system 100 according to embodiments of the present invention. The illustrated communications patching system 100 includes a patch panel 110 that includes a connector port array 114 and an RFID antenna array 112 (the individual RFID antennas 113 that comprise the array 112 are not depicted in FIG. 3). It will be appreciated that instead of the patch panel 110, the communications patching system 100 could be implemented on (or as part of) another interconnect device that includes a plurality of connector ports such as, for example, a network switch. The connector port array 114 comprises a plurality of connector ports 116 (the individual connector ports 116 are not depicted in FIG. 3, but may, for example, be similar to the connector ports 16 depicted in FIG. 1). As is also shown in FIG. 3, the RFID enabled communications patching system 100 further includes an RFID transceiver 120, a microcontroller 122 and a switching circuit 130. The microcontroller 122 may, in some embodiments, control the REID transceiver 120 by for example, providing control signals that control when the RFID transceiver 120 transmits signals. The microcontroller 122 may also, in some embodiments, control the switching circuit 130 by, for example, providing control signals that control the switching circuit to enable a signal path between the RFID transceiver 120 and one particular RFID antenna 113 in the RFID antenna array 112 at a time. It will be appreciated that the communications patching system 100 will typically include multiple patch panels 110, and may also include more than one RFID transceiver 120, switching circuit 130 and/or microcontroller 122.

Figure 4:
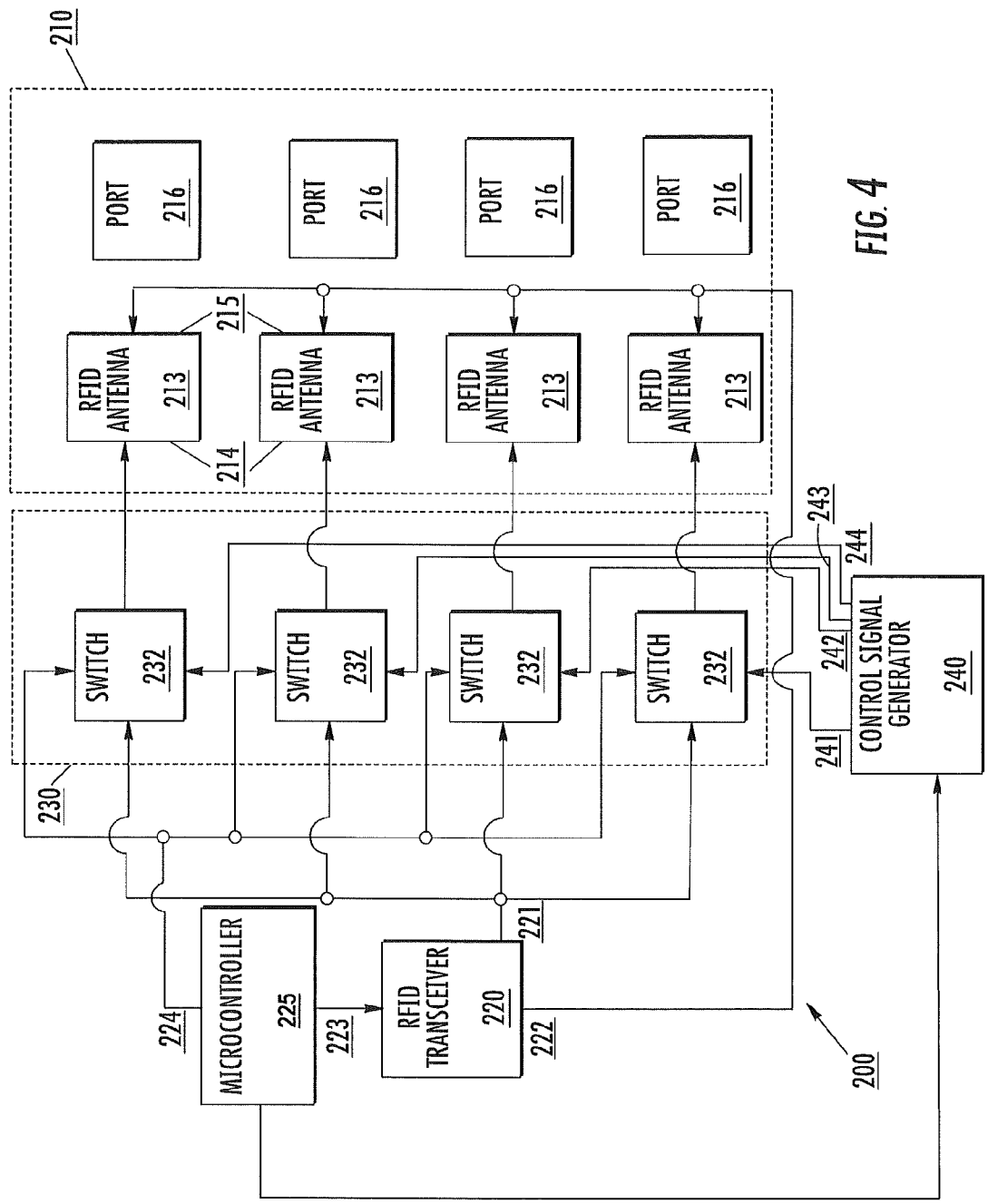
FIG. 4 is a block diagram of one specific implementation, according to embodiments of the present invention, of the communications patching system of FIG. 3.

FIG. 4 is a block diagram of one specific embodiment 200 of the communications patching system of FIG. 3. For illustration purposes, in FIG. 4 the communications patching system 200 is illustrated as having a single patch panel 210, and the patch panel 210 is illustrated as having only four connector ports 216. It will be appreciated, however, that typically the communications patching system 200 will include a plurality of patch panels, switches and the like that are used to interconnect connector ports that are dispersed throughout a building with network servers or other network or centralized equipment. As is shown in FIG. 4, the patching system 200 includes an RFID transceiver 220 that has first and second output ports 221, 222. The patching system further includes a plurality of switches 232 that comprise a switching circuit 230, as well as a plurality of RFID antennas 213. Each RFID antenna 213 has first and second inputs 214, 215. As shown in FIG. 4, output port 221 of transceiver 220 is coupled to an input port or terminal of each of the plurality of switches 232. The output of each switch 232, in turn, is coupled to the first input port 214 on a respective one of the RFID antennas 213. Output port 222 of transceiver 220 is coupled to the second input port 215 on each RFID antenna 213. A plurality of connector ports 216 are also provided on the patch panel 210. Each connector port 216 is associated with a respective one of the RFID antennas 213.

The communications patching system 200 further includes a microcontroller 225. A first output 223 of the microcontroller is coupled to the RFID transceiver 220. A control signal may be transmitted from the microcontroller 225 to the RFID transceiver 220 via output 223 that, for example, controls when the RFID transceiver 220 outputs one or more signals (or a differential signal) on outputs 221 and 225. A second output 224 of the microcontroller 225 is commonly coupled to a first control port or terminal of each switch 232. A control signal may be transmitted from the microcontroller 225 to each switch 232 via output 224. As is further shown in FIG. 4, the communications patching system 200 further includes a control signal generator 240. The control signal generator 240 includes a plurality of outputs 241-244. Each output 241-244 is coupled to a second control port terminal of each switch 232. As shown in FIG. 4, the control signal generator 240 may operate under the control of the microcontroller 225. The microcontroller 225 and the control signal generator 240 may provide control signals that together control whether or not each switch 232 is open or closed.

The communications patching system 200 of FIG. 4 may operate as follows. Each RFID antenna 213 is located at or adjacent to a respective one of the connector ports 216 on patch panel 210. By way of example, each RFID antenna 213 may be located immediately above, immediately below, immediately behind, or on one side of a port aperture of each connector port 216 (i.e., an aperture that receives or holds a mating communications connector that is attached to an end of a patch cord). Each RFID antenna 213 may be designed to have a very small emission field such that signals transmitted by the antenna will only be received by RFID tags that are inserted into the connector port 216 associated with each respective RFID antenna 213, and will not be received by any other connector ports 216 on the patch panel 210. In some embodiments, multiple RFID antennas 213 may be implemented on a single printed circuit board that is mounted on the patch panel 210 behind or next to a plurality of the connector ports 216.

In order to identify the connectivity of the patch cords that are plugged into patch panel 210, the microcontroller 225 and the control signal generator 240 may provide control signals that close a first of the switches 232 (i.e., which allow the switch 232 to pass a signal that is present at the input port of the switch), while opening the remainder of the switches 232 (i.e., configure the switch 232 so that it will not pass a signal that is present at input port of the switch). The microcontroller 225 may also send a control signal to the RFID transceiver 220 that causes the RFID transceiver 220 to generate and transmit, perhaps repeatedly, a differential signal. This differential signal passes to only one of the four switches 232 (for purposes of example, the uppermost, switch 232 in FIG. 4), as only one of the four switches 232 is closed. The differential signal that is passed to the uppermost RFID antenna 213 is transmitted by the antenna for so long as the uppermost switch 232 remains closed. If a patch cord that includes an RFID tag is inserted into the uppermost of the connector ports 216 pictured in FIG. 4, that RFID tag will be excited by the field emitted by the uppermost RFID antenna 213, and will transmit information such as a unique identifier that is stored in a memory of the RFID tag. This signal that is transmitted by the RFID tag is received by the uppermost RFID antenna in FIG. 4, and passed through the closed signal paths (e.g., through switch 232) to the RFID transceiver 220 where it is received and decoded to determine the unique identifier that is stored in the memory of the RFID tag. This unique identifier may then be stored in a database or other storage means and/or displayed on a monitor.

After a period of time, the microcontroller 225 and/or the control signal generator 240 may change one or more of the control signals that are provided to the switches 232 so as to open the uppermost switch and close a different one of the switches. Operations will then be repeated as explained above with respect to the uppermost switch with the next switch that is closed in order to identify the unique identifier associated with any RFID tag of any patch cord connector that is plugged into the connector port 216 associated with the RFID antenna 213 that is connected to the closed switch 232. Operations may continue until the switch 232 associated with each of the antennas 213 has been closed in order to identify the unique identifier associated with the RFID tag, if any, of the patch cord connector, if any, that is plugged into the connector port 216 associated with the RFID antenna 213 that is connected to the closed switch 232.

FIG. 5A is a plan view of an RFID antenna 260 according to embodiments of the present invention. FIG. 5B is a cross-sectional view of the RFID antenna 260 taken along the line 5B-5B of FIG. 5A. As shown in FIGS. 5A and 5B, the RFID antenna 260 is implemented as a spiraled copper trace pattern 266 that is deposited on a multi-layer printed circuit board 262. Herein, the term "spiral" is not limited to square rectangular, helical or circular patterns, but instead includes any pattern that generally circles around a central point (with either constant or varying increase in distance from the central point) in two or three dimensions. As shown best in FIG. 5B, in this particular embodiment, the printed circuit board 262 is an eight layer printed circuit board having layers 271-278. As shown in FIG. 5A, the copper trace 264 that is provided on the uppermost layer 271 of the printed circuit board 262 is in a generally spiral pattern. (Note that reference numeral 264 refers to the copper trace on a particular layer of printed circuit board 262, whereas reference numeral 266 refers to the copper trace pattern that is formed by the combination of copper traces 264 on each layer and the interconnecting conductive vias 267 that are discussed below). In some embodiments, copper traces 264 having similar or the same spiral pattern as the copper trace 264 on the uppermost layer 271 of the printed circuit board 262 may be deposited on each of the remaining layers 272-278. In some embodiments (such as the one depicted in FIGS. 5A and 5B), the spiral copper trace 264 on each layer may overlap the copper traces 264 on underlying layers when viewed from the plan view perspective of FIG. 5A. As shown best in FIG. 5B, conductive through holes such as metal-filled vias 267 may connect the copper trace 264 on a first layer to the copper trace 264 on an adjacent layer. In this particular embodiment, a first input 268 to the RFID antenna 260 is an end of the copper trace 264 on layer 271 of the printed circuit board 262, and a second input 269 is the end of a metal-plated via 267 that extends through layer 278 of printed circuit board 262. While FIGS. 5A and 5B depict one possible embodiment of an RFID antenna that may be used in the communications patching systems according to embodiments of the present invention, it will be appreciated that numerous other RFID antenna designs may be used.

Figure 6:
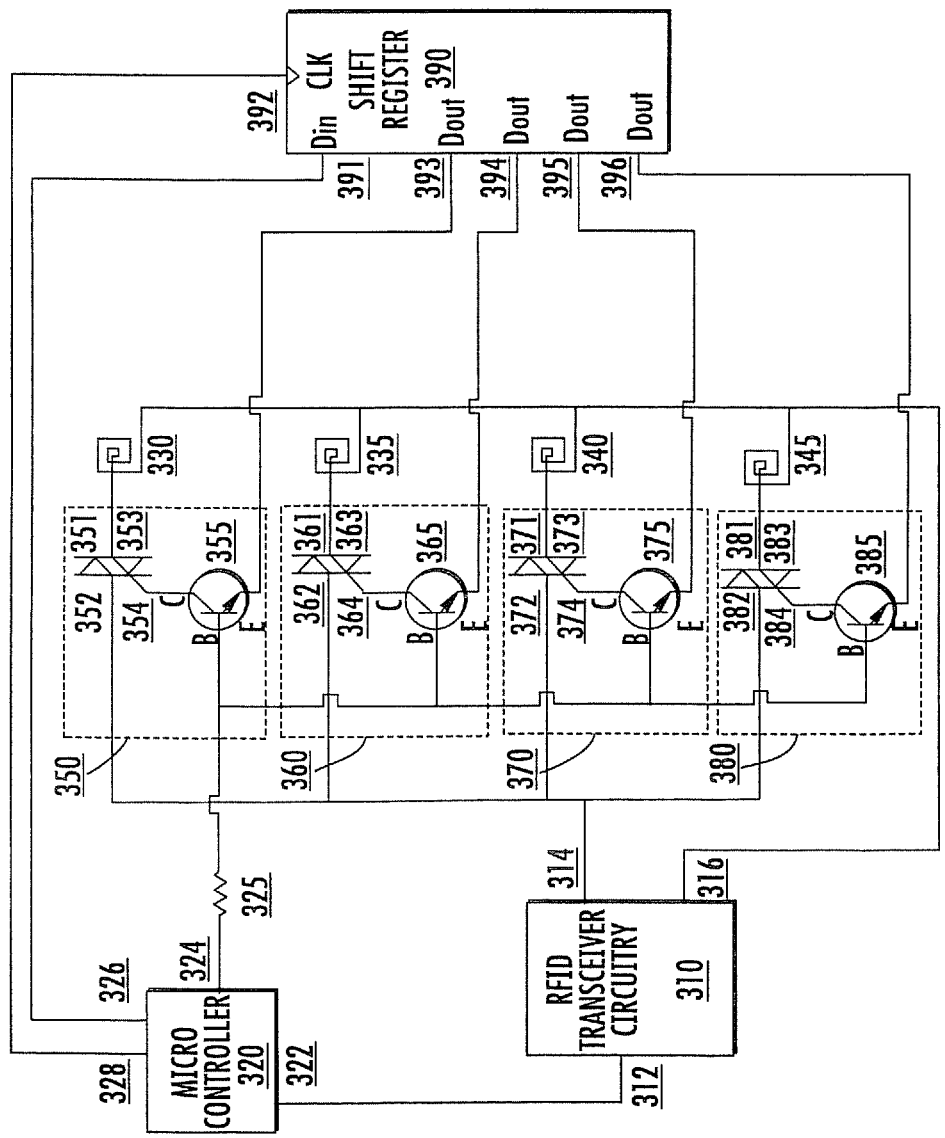
FIG. 6 is a detailed block/circuit diagram of a communications patching system according to further embodiments of the present invention.

FIG. 6 is a block diagram of a communications patching system 300 according to certain embodiments of the present invention. As shown in FIG. 6, the communications patching system 300 includes an RFID transceiver 310 that includes all input 312 and first and second outputs 314, 316. The RFID transceiver 310 may comprise, for example, a Philips HTRC110 IC that produces a 1125 kHz differential alternating current output waveform on the first and second outputs 314, 316. The Philips HTRC110 IC is a commercially available integrated circuit that may be mounted on a printed circuit board. The communications patching system 300 further includes a controller 320 (here a microcontroller) that includes first through fourth outputs 322, 324, 326, 328. The first output 322 of the microcontroller 320 is coupled to the input 312 of RFID transceiver 310. Output 326 of the microcontroller 320 is coupled to the input 391 of a shift register 390, which is described in more detail herein. Output 328 of microcontroller 320 provides a clock signal that is coupled to input 392 of shift register 390. Output 324 of the microcontroller 320 is discussed below.

The system 300 further includes first through fourth RFID antennas 330, 335, 340, 345. Each RFID antenna has respective first and second inputs. Each RFID antenna 330, 335, 340, 345 may be mounted adjacent to a respective port on a patch panel (neither the patch panel nor the ports thereof are shown in FIG. 6) that is part of the communications patching system 300.

The communications patching system 300 also includes first through fourth switches 350, 360, 370, 380 and a shift register 390. The components and operation of switch 350 will be described in detail herein. As shown in FIG. 6, each of switches 360, 370 and 380 may be implemented in like fashion. Accordingly, a detailed explanation of the components and operation of switches 360, 370 and 380 will be omitted.

As shown in FIG. 6, switch 350 comprises a thyristor 351 and a bipolar junction transistor ("BJT") 355. Thyristor 351 includes an input terminal 352, an output terminal 353 and a gate terminal 354. The input 352 of thyristor 351 is coupled to output 314 of RFID transceiver 310. Note that the inputs 362, 372, 382 of thyristors 361, 371, 381, respectively, are also commonly coupled to output 314 of RFID transceiver 310. The output 353 of thyristor 351 is coupled to the first input of RFID antenna 330. The gate lead 354 of thyristor 351 is coupled to the collector of BJT 355. The base of BJT 355 is coupled through a resistor 325 to output 324 of microcontroller 320. Note that the bases of BJTs 365, 375, 385 are also commonly coupled to output 324. The emitter of BJT 355 is coupled to a first output 393 of the shift register 390. The emitters of BJTs 365, 375, 385 are coupled to respective second through fourth outputs 394-396 of shift register 390. The output 316 of RFID transceiver 310 is commonly coupled to the respective second inputs of RFID antennas 330, 335, 340, 345.

While the communications patching system 300 of FIG. 6 is implemented using BJTs, it will be appreciated that other types of transistors (or other circuit elements) such as, for example, field effect transistors may be used in certain embodiments. It will also be appreciated that transistors typically include three terminals: a control terminal and two controlled terminals. For example, in a BJT, the collector and emitter comprise controlled terminals that are controlled by the gate, which is the control terminal (i.e., the terminal that determines whether current flows from the emitter to the collector).

The communications patching system 300 of FIG. 6 may operate as follows. While this description will focus primarily on operation of the switch 350 and RFID antenna 330, it will be appreciated that switches 360, 370, 380 and RFID antennas 335, 340, 345 will operate similarly. Operations may begin with firmware (or software or hardware) on the microcontroller 320 causing a "low" control signal to be supplied to lead 324 of the microcontroller 320. When such a "low" control signal (e.g., 0 volts) is supplied to lead 324, all four BJTs 355, 365, 375, 385 are turned off. As shown in FIG. 6, the signal output on lead 314 of RFID transceiver 310 can only flow to, for example, RFID antenna 330 if the gate lead 354 of thyristor 351 is activated. The gate lead 354 of thyristor 351 may only be activated if, among other things, the BJT 355 is activated. Accordingly, when the microcontroller 320 outputs the "low" control signal on lead 324, all four BJTs 355, 365, 375, 385, all four thyristors 351, 361, 371, 381, and all four RFID antennas 330, 335, 340, 345, are disabled.

Thereafter, the microcontroller 320 issues commands that serially energize the RFID antennas 330, 335, 340, 345. In particular, the microcontroller 320 shifts a new set of bits into the shift register 390 via output lead 326. The bit pattern is selected such that the output bits on leads 393-396 of the shift register 390 are all set to a "high" value (e.g., 5 volts) except for the output bit that is associated with the RFID antenna that is to be activated, which is set to a "low" value. For example, if RFID antenna 330 is to be activated, then output bit 393 is set to a "low" value, and output bits 394-396 are set to "high" values. The microcontroller 320 also issues a command on output 322 that energizes the RFID transceiver 310 (i.e., causes the RFID transceiver to transmit an output signal on leads 314, 316). This command may be issued before or after the new set of bits are shifted into shift register 390, depending upon the particular implementation. Once the RFID transceiver output signal reaches its full voltage level, the microcontroller 320 pulls the signal output on lead 324 to a "high" value. This has no effect on the BJTs 365, 375, 385 since the emitters of these BJTs are at a "high" level due to the shift register setting on shift register leads 394-396, as the base-to-emitter voltage is insufficient to forward bias BJTs 365, 375, 385. Accordingly, BJTs 365, 375, 385 remain inactive, and thyristors 361, 371, 381 and RFID antennae 335, 340, 345 remain disabled. However, since a "low" bit is output on lead 393 of shift register 390, the "high" signal coupled to the base of BJT 355 forward biases the BJT 355. Activation of BJT 355 in turn activates thyristor 351, thereby allowing the output signal on lead 314 of RFID transceiver 310 to flow through the thyristor 351 to RFID antenna 330. Thus, the signals output on leads 314, 316 of the RFID transceiver 310 activate RFID antenna 330. As discussed above with respect to the embodiment of FIG. 4, once RFID antenna 330 is activated, it may transmit an alternating current signal of fixed amplitude and frequency, with the frequency matching the resonance frequency of any RFID tag that is inserted into the connector port (not pictured in FIG. 6) that is associated with RFID antenna 330. When energized by this signal, the RFID tag sends information back, including the unique identifier that is stored in the memory of the REID tag, by altering the load placed by the RFID tag on the signal transmitted by RFID antenna 330, thereby causing the amplitude of the transmitted signal to vary over time. The RFID transceiver 330 detects these variations (via a signal carried over leads 314, 316), demodulates them, and converts them from an analog signal to a digital signal. The microcontroller 320 may then determine the unique identifier that is included in the information sent from the RFID tag. This unique identifier may then, for example, be stored in a database or other storage means and/or displayed on a monitor.

After some period of time, the microcontroller 320 may send a signal to the REID transceiver 330 that causes the RFID transceiver to turn off its output signal. Then, the microcontroller 320 sends a signal to the shift register 390 that shifts the bits. The microcontroller 320 may then send another signal to the REID transceiver 330 that causes the RFID transceiver to turn the output signal back on. Together, the above-described operations inactivate the thyristor 351 and activate the thyristor 361. This process may continue until the "low" output bit has shifted through each output of the shift register 390 so that each RFID antenna 330, 335, 340, 345 has been activated, and the unique identifiers stored on RFID tags that are mounted on patch cord connectors plugged into the respective connector ports associated with each RFID antenna 330, 335, 340, 345 are determined.

In some embodiments of the communications patching system 300 of FIG. 6, the microcontroller 320 may activate a control signal on output 322 that controls the RFID transceiver 310 to output a signal on leads 314, 316 before the microcontroller 320 activates a control signal on output 324 that provides a turn-on voltage to the base of the BJTs 355, 365, 375, 385.

While not pictured in FIG. 6, in some embodiments, a resistor may be provided between the collector of each BJT 355, 365, 375, 385 and the gate lead 354, 364, 374, 384 of the respective thyristor 351, 361, 371, 381 to which each collector is coupled. These resistors may facilitate limiting the current flow out of the gate lead of the thyristors 351, 361, 371, 381, which, if too large, may damage the shift register 390, and/or which may reduce any siphoning of the signal power of the signal output from the RFID transceiver 310 on leads 314, 316 through the gates of the thyristors 351, 361, 371, 381. In still other embodiments of the communications patching system 300 of FIG. 6, the shift register 390 may be omitted. For example, in one such modified embodiment, the microcontroller 320 would include sufficient output ports so that the microcontroller 320 may directly output the information that is output on leads 393-396 of shift register 390 of FIG. 6 (i.e., leads 393-396 run directly from the microcontroller 320 to the emitters of BJTs 355, 365, 375, 385). This modified embodiment has the advantage of eliminating the need for the shift register 390, but may require that the microcontroller 320 include a large number of leads (i.e., more leads than the number of RFID antennas).

Figure 7:
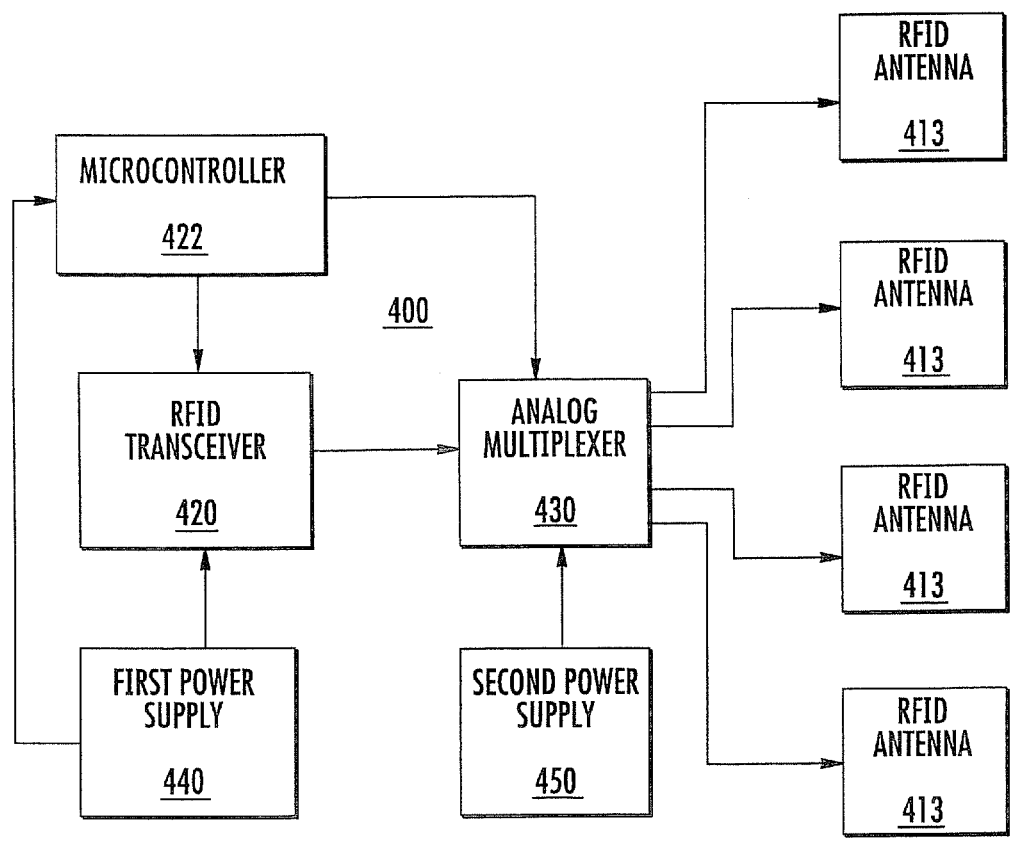
FIG. 7 is a block diagram of another communications patching system according to embodiments of the present invention.

FIG. 7 is a block diagram of a communications patching system 400 according to further embodiments of the present invention. As shown in FIG. 7, the communications patching system 400 includes a plurality of RFID antennas 413. Each RFID antenna 413 is associated with a respective one of a plurality of connector ports 416 that are provided on a patch panel 410 (for the sake of simplicity, neither the patch panel 410 nor the connector ports 416 are depicted in FIG. 7). As is also shown in FIG. 7, the RFID enabled communications patching system 400 further includes an RFID transceiver 420, a microcontroller 422 and an analog multiplexer 430. The analog multiplexer 430 selectively provides an output signal from the RFID transceiver 420 to one of the plurality of RFID antennas 413. The microcontroller 422 may, in some embodiments, control the RFID transceiver 420 by, for example, providing control signals that control when the RFID transceiver 420 transmits signals. The microcontroller 422 may also, in some embodiments, control the analog multiplexer 430 so as to control which output port of the analog multiplexer 430 receives the signal input to the multiplexer 430 from the RFID transceiver 420. Thus, the analog multiplexer 430 may be used to sequentially energize the RFID antennas 413 in order to detect, and read information from, any patch cords that are plugged into the connector ports associated with the respective RFID antennas 413 that include RFID tags. It will be understood by comparing the embodiments of FIGS. 3 and 7 that the analog multiplexer 430 of FIG. 7 may be used in place of the switching circuit 130 of FIG. 3.

As is also shown in FIG. 7, the communications patching system 400 may further include a first power supply 440 and a second power supply 450. The first power supply 440 may provide a first power supply voltage, and the second power supply 450 may provide a second power supply voltage that is higher than the first power supply voltage. By way of example, in some embodiments, the first power supply voltage may be 5 volts, and the second power supply voltage may be 10 volts. As shown in FIG. 7, the first power supply voltage is provided to the RFID transceiver 420 and the microcontroller 422. The second, higher power supply voltage is provided to the analog multiplexer 430. The second power supply voltage is higher than the peak voltage of the signal that is output by the RFID transceiver 420. The first power supply 440 may be generated by a circuit that splits or otherwise lowers an output of the second power supply 450. The first and second power supplies 440, 450 may be mounted on the patch panel, mounted on a rack manager panel, or mounted in any other location where it can be used to feed the first and second power supply voltages to various of the components of the communications patching system 400.

Figure 8:
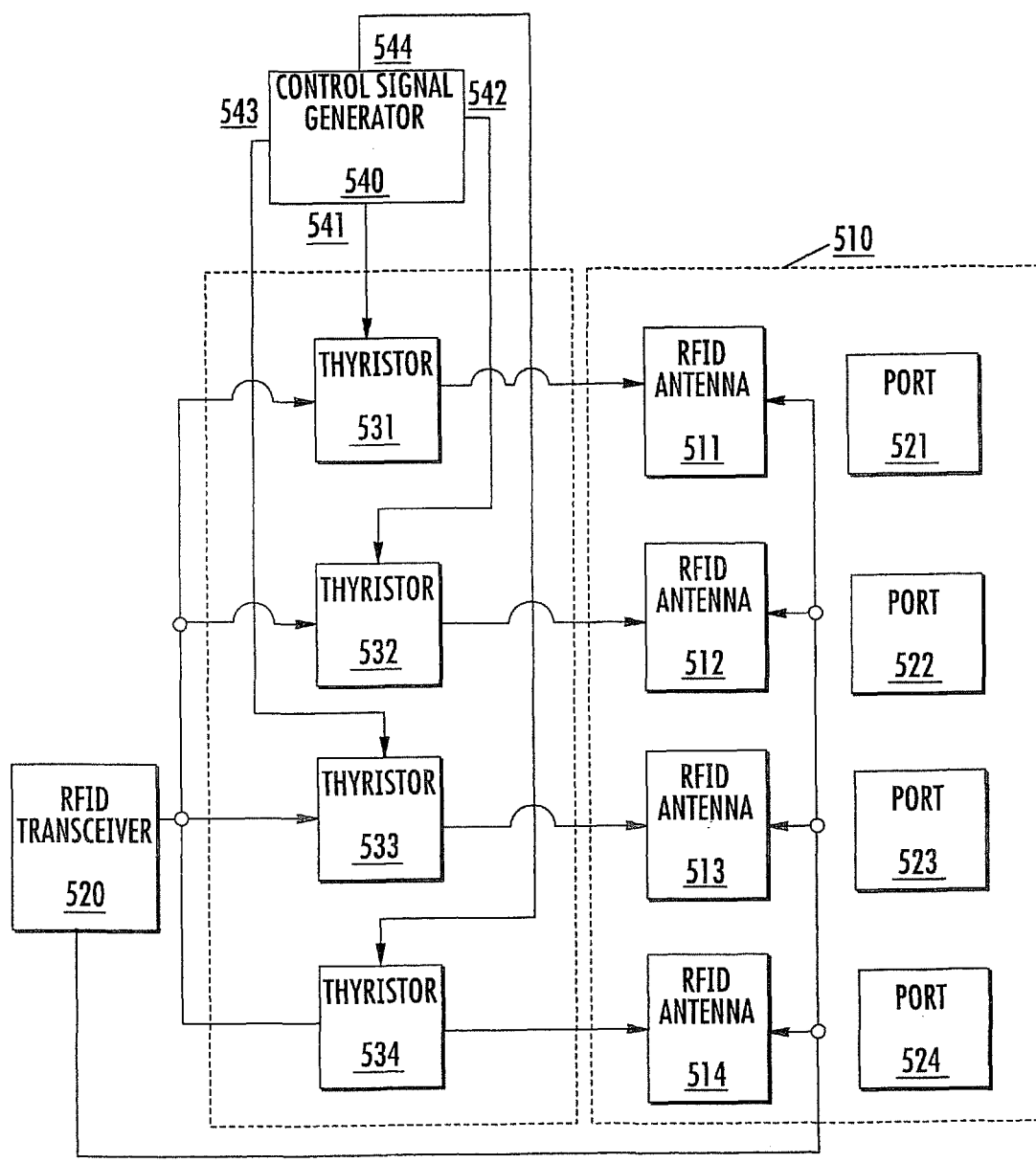
FIG. 8 is a block diagram of yet another communications patching system according to embodiments of the present invention.

FIG. 8 is a block diagram of a communications patching system 500 according to embodiments of the present invention. The communications patching system 500 is illustrated as having a single patch panel 510, and the patch panel 510 is illustrated as having only four connector ports 521-524. It will be appreciated, however, that typically the communications patching system 500 will include a plurality of patch panels, switches and the like.

As is shown in FIG. 8, the patching system 500 includes an RFID transceiver 520. The patching system further includes a plurality of thyristors 531-534, as well as a plurality of RFID antennas 511-514, each of which is associated with a respective connector port 521-524 on patch panel 510. A first output of transceiver 520 is coupled to an input terminal of each of the plurality of thyristors 531-534. The output of each thyristor 531-534 is coupled to a first lead on a respective one of the RFID antennas 511-514. A second output of transceiver 520 is coupled to a second lead on each RFID antenna 511-514. Finally, in some embodiments, a control signal generator 540 may be provided that includes a plurality of outputs 541-544 that are coupled to respective control gates of the thyristors 531-534. The control signal generator 540 may generate control signals that may be used to sequentially activate each of the thyristors 531-534.

The communications patching system 500 of FIG. 8 may operate as follows. The control signal generator 540 sets the control signals on lines 541-544 so as to activate one of thyristors (e.g., thyristor 531), while disabling the remaining thyristor-s (e.g., thyristors 532-534). The RFID transceiver 520 outputs a signal that is coupled to RFID antenna 511 via thyristor 531, thereby energizing RFID antenna 511 and causing it to transmit a signal. If a patch cord that includes an RFID tag is inserted into the connector port 521 that is associated with RFID antenna 511, the RFID tag will be excited by the field emitted by RFID antenna 511. The RFID tag will consequently transmit information such as a unique identifier that is stored in a memory of the RFID tag. This signal that is transmitted by the RFID tag is received by RFID antenna 511 and passed though the closed signal paths (e.g., through thyristor 531) to the RFID transceiver 520 where it is received and decoded to determine the unique identifier that is stored in the memory of the RFID tag. This unique identifier may be then be stored in a database or other storage means and/or displayed on a monitor. Each thyristor 532-534 may be activated sequentially in a similar fashion to identify the unique identifier associated with any RFID tag of any patch cord connector that is plugged into the connector port 216 associated with RFID antennas 512-514.

It will be appreciated that the various components of the communications patching systems according to certain embodiments of the present invention described herein may be mounted or located in different places. By way of example, the RFID antennas for a specific patch panel (or other interconnect device) may be located on, for example, (a) printed circuit boards that include circuits that are part of the individual connector ports of a patch panel, (b) one or more separate printed circuit boards that are mounted on, in or adjacent to the patch panel, or (c) other elements of the patch panel adjacent each connector port (i.e., when non-printed circuit board antennas such as small helical antennas are used). The RFID transceivers described herein may also be mounted in a variety of locations. In some embodiments, the RFID transceiver may be an integrated circuit chip that is mounted on a printed circuit board associated with each patch panel. This printed circuit board may, for example, be a printed circuit board that includes circuits that are part of at least some of the individual connector ports of a particular patch panel, a separate printed circuit board that is mounted on, in or adjacent to the patch panel, or a printed circuit board on, for example, a rack controller. The system may include one or more RFID transceivers, and each RFID transceiver may be used to track the connectivity of (a) a subset of the connector ports on a patch panel, (b) all of the connector ports on a patch panel or (c) the connector ports on multiple patch panels.

Likewise, the controllers described herein may be mounted in a variety of locations, including each of the locations discussed above where the RFID transceivers may be mounted. The controller may, but need not, be mounted on the same printed circuit board as the RFID transceiver (in embodiments where both the RFID transceiver and the controller comprise printed circuit board mountable chips, circuits or devices). The thyristors, transistors and resistors included in various embodiments of the present invention may be implemented as discrete elements or as small integrated circuits. The thyristors and transistors are typically, but need not be, mounted on the same printed circuit board as the RFID antenna that they are associated with (if a printed circuit board mountable RFID antenna is used). The shift register included in certain embodiments may, for example, comprise a commercially available shift register chip that is mounted, for example, on the same printed circuit board as the controller.

Herein, references are made to various input ports, terminals, leads and the like as well as to various output ports, terminals, leads and the like such as, for example, the various inputs and outputs of the RFID transceivers described herein and the inputs to the various RFID antennas described herein. It will be appreciated that an "input" may comprise an "output" or an "output" may comprise an "input" depending upon the direction of signal/current flow, which may vary depending upon the specific implementation of the various embodiments described herein and/or based upon whether the circuitry at issue is transmitting or receiving information. Accordingly, the terms "input" and "output" are used to identify specific ports, terminals and/or leads of the devices at issue, but are not intended to be limiting with respect to the signal/current flow through those ports, terminals and/or leads.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A communications patching system, comprising:
a communications patching interconnect device that includes:
a plurality of connector ports that are each configured to receive a communications patch cord; and
a plurality of antennas that are each associated with a respective one of the plurality of connector ports;
a radio frequency identification ("RFID") transceiver having a first output;
a controller; and
a switching circuit that includes a plurality of semiconductor switches that are configured to selectively couple one of the plurality of antennas to the first output of the RFID transceiver under the control of the controller,
wherein there is a one-to-one correspondence between the plurality of semiconductor switches and the plurality of antennas, and
wherein respective ones of the semiconductor switches are coupled between respective ones of the plurality of antennas and the first output of the RFID transceiver, wherein the plurality of semiconductor switches comprise a plurality of thyristors, and wherein each of the plurality of thyristors is serially connected between a respective one of the plurality of antennas and the RFID transceiver;
wherein the switching circuit further includes a plurality of transistors, wherein each of the plurality of transistors is coupled to a gate of a respective one of the plurality of thyristors.

2. The communications patching system of claim 1, wherein the switching circuit further includes a shift register having a plurality of outputs that are coupled to respective ones of the plurality of transistors.

3. The communications patching system of claim 2, wherein each transistor of the plurality of transistors includes a first terminal that is coupled to the gate of a respective one of the thyristors, a second terminal that is coupled to a respective shift register output, and a third terminal that is coupled to a first output of the controller.

4. The communications patching system of claim 3, wherein a second output of the controller is coupled to an input of the shift register.

5. The communications patching system of claim 4, wherein the RFID transceiver operates in response to the controller, and wherein the controller is configured to activate the RFID transceiver prior to applying a turn-on voltage to the first terminal of any of the plurality of transistors.

6. A communications patching system, comprising:
an interconnect device that includes a plurality of connector ports;
a plurality of antennas, each of which is associated with a respective one of the plurality of connector ports;
a radio frequency identification ("RFID") transceiver;
a plurality of switches; and
wherein the RFID transceiver is commonly coupled to each of the plurality antennas through respective ones of the plurality of switches, wherein each of the plurality of switches comprises a thyristor that is interposed on respective ones of a plurality of electrical paths that connect the plurality of antennas to the RFID transceiver;
wherein each of the plurality of switches further comprises a transistor that is coupled to a gate lead of the thyristor.

7. The communications patching system of claim 6, further comprising a controller having a first output that is coupled to the RFID transceiver and a second output that is commonly coupled to each of the plurality of transistors, wherein the controller identifies and logs a plurality of patch cord interconnections with the plurality of connector ports.

8. The communications patching system of claim 7, further comprising a shift register that is responsive to the controller, the shift register having a plurality of outputs that are coupled to respective ones of the of transistors.

9. A communications patching system, comprising:
a patch panel that includes a plurality of connector ports;
a plurality of antennas, each of which is associated with a respective one of the plurality of connector ports;
a radio frequency identification ("RFID") transceiver having an output; a plurality of thyristors, wherein an input of each thyristor is coupled to an output of the RFID transceiver and an output of each thyristor is coupled to a respective one of the plurality of antennas, further comprising a plurality of transistors wherein each of the plurality of transistors is coupled to a gate of a respective one of the plurality of thyristors.

10. The communications patching system of claim 9, further comprising a patch cord that is configured to selectively interconnect a first of the connector ports with a connector port on another interconnect device, wherein the patch cord comprises opposite ends and a respective connector secured to each end, wherein each connector is configured to be removably secured within a connector port, wherein each connector of the patch cord includes an RFID tag that stores identification information, and wherein the RFID transceiver, when coupled to the respective one of the plurality antennas, determines the presence of and/or identifies the patch cord by reading the stored identification information found in the included RFID tag of the patch cord.

11. A communications patching system, comprising:
a communications patching interconnect device that includes a plurality of RJ-45 connector ports;
a plurality of antennas that are associated with respective ones of the plurality of connector ports;
a radio frequency identification ("RFID") transceiver having a first output;
a plurality of RJ-45 patch cables, each one of the patch cables further including a corresponding RFID tag identifying the attached patch cable;
a plurality of electrical paths that connect the first output of the RFID transceiver to respective ones of the plurality of antennas;
a controller; and
a switching circuit that includes a plurality of semiconductor switches that are interposed on respective ones of the plurality of electrical paths, the switching circuit configured to selectively couple one of the plurality of antennas to the first output of the RFID transceiver under the control of the controller, wherein the switching circuit further includes a shift register having a plurality of outputs that are coupled to respective ones of the semiconductor switches, the selected coupled one of the plurality of antennas cooperating with the RFID transceiver to identify a corresponding RFID tag attached to one of the plurality of RJ-45 patch cables to determine the presence and/or identity of one of the plurality of RJ-45 patch cables coupled to one of the plurality of RJ-45 connector ports proximate to the selected coupled one of the plurality of antennas.

* * * * *

UNITED STATES PATENT AND TRADEMARK OFFICE
CERTIFICATE OF CORRECTION

PATENT NO. : 8,461,964 B2
APPLICATION NO. : 11/871448
DATED : June 11, 2013
INVENTOR(S) : Macauley et al.

Page 1 of 1

It is certified that error appears in the above-identified patent and that said Letters Patent is hereby corrected as shown below:

In the Claims:
Column 18, Claim 9, Line 15:
    Please begin a new paragraph after "having an output;" in line 15 so that it reads
as follows: -- having an output;
        a plurality of thyristors, wherein an --

Column 18, Claim 10, Line 29:
    Please correct "connector port, wherein each"
        to read -- connector port, and wherein each --

Column 18, Claim 11, Line 56:
    Please begin a new paragraph after "control of the controller," in line 56 so that it reads
as follows: -- control of the controller,
        wherein the switching circuit --

Signed and Sealed this
Ninth Day of September, 2014

Michelle K. Lee
*Deputy Director of the United States Patent and Trademark Office*